US008405641B2

(12) United States Patent
Tseng

(10) Patent No.: US 8,405,641 B2
(45) Date of Patent: Mar. 26, 2013

(54) EXPANSIBLE STYLUS AND FIXING STRUCTURE FOR FIXING STYLUS THEREOF

(75) Inventor: Tien-Chung Tseng, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 862 days.

(21) Appl. No.: 12/207,500

(22) Filed: Sep. 10, 2008

(65) Prior Publication Data

US 2009/0231306 A1 Sep. 17, 2009

(30) Foreign Application Priority Data

Mar. 17, 2008 (TW) ................................ 97204550 U

(51) Int. Cl.
*G06F 3/033* (2006.01)

(52) U.S. Cl. .................. 345/179; 178/18.01; 178/19.01; 345/173; 345/156; 211/69.1; 401/111

(58) Field of Classification Search .................... 411/21, 411/69
See application file for complete search history.

(56) References Cited

U.S. PATENT DOCUMENTS 431,259 A * 7/1890 Emrich ........................... 411/21
3,352,193 A * 11/1967 Lerich ............................. 411/79
5,422,442 A * 6/1995 Gouda et al. ............... 178/19.01
5,476,350 A * 12/1995 Kurtz et al. .................. 411/80.2
5,747,748 A * 5/1998 Zigler ........................ 178/18.01
5,850,059 A * 12/1998 Yoshimura ................. 178/19.01
6,392,639 B1 * 5/2002 Lee et al. ...................... 345/179
6,535,199 B1 * 3/2003 Canova et al. ............... 345/168
6,746,191 B2 * 6/2004 Edland ............................ 411/34
6,914,596 B2 * 7/2005 Liu et al. ....................... 345/179
7,023,430 B2 * 4/2006 Liu et al. ....................... 345/179
7,077,594 B1 * 7/2006 Annerino et al. ............. 401/258
7,362,563 B2 * 4/2008 Love ........................ 361/679.01
7,419,320 B2 * 9/2008 LaBrasca ...................... 401/131
2003/0184529 A1 * 10/2003 Chien et al. ................... 345/179
2004/0233177 A1 * 11/2004 Blacklock ..................... 345/179
2008/0170048 A1 * 7/2008 Hua ............................. 345/179
2010/0084202 A1 * 4/2010 Selin et al. ................. 178/19.01

* cited by examiner

*Primary Examiner* — William L Boddie
*Assistant Examiner* — Christopher Thompson
(74) *Attorney, Agent, or Firm* — Winston Hsu; Scott Margo

(57) ABSTRACT

A stylus includes an expansible structure. A chamber is formed inside the expansible structure. The stylus further includes an inner body installed inside the chamber in a movable manner relative to a first direction for pressing the expansible structure when moving in the first direction so that the expansible structure expands in a second direction.

13 Claims, 4 Drawing Sheets

EXPANSIBLE STYLUS AND FIXING STRUCTURE FOR FIXING STYLUS THEREOF

BACKGROUND OF THE INVENTION

1. Field of the Invention

The present invention relates to a stylus and a fixing structure for fixing the stylus, and more particularly, to an expansible stylus capable of wedging inside a penholder and a fixing structure for fixing the stylus.

2. Description of the Prior Art

In modern information society, portable electronic devices are widely used in every field. A large quantity of data is communicated, processed, and stored in digital data format, thus computers used for reading and accessing data have become very important tools. Especially portable computers such as notebooks and personal digital assistants (PDAs), which by their small size, lightness, and portability, help users to search, browse, and store various kinds of data at anytime at any place. Therefore, portable computers have become one of the most important digital data platforms and the focus of much development. Concerning portable computers, both compactness and usability of the human input interface are emphasized; therefore a touch panel is used as part of the man machine interface (MMI). When a user touches or presses on the touch panel, the touch panel can sense the position or even the strength of the stress and control the computer according to the associated command.

As for a fixing mechanism for fixing a stylus in the portable electronic device, a slot is formed on a lateral side of the portable electronic device and the stylus is disposed inside the slot. At least one recess is formed on the slot for wedging a dot on the stylus so as to fix the stylus inside the slot. However, the dot of the stylus and the recess of the slot are worn away due to repeated utilization resulting in loose connection of the stylus and the slot. It causes damage of the stylus when the stylus falls from the slot or reduces waterproof effect due to leak. Furthermore, the recess of the slot is complicated for manufacture resulting in increase of cost.

SUMMARY OF THE INVENTION

It is therefore a primary objective of the invention to provide a stylus and a fixing structure for fixing the stylus for solving the above-mentioned problem.

According to the claimed invention, a stylus includes an expansible structure. A chamber is formed inside the expansible structure. The stylus further includes an inner body installed inside the chamber in a movable manner relative to a first direction for pressing the expansible structure when moving in the first direction so that the expansible structure expands in a second direction.

According to the claimed invention, a fixing structure includes a penholder. A slot is formed inside the penholder. The fixing structure includes a stylus installed inside the slot of the penholder. The stylus includes an expansible structure. A chamber is formed inside the expansible structure. The stylus further includes an inner body installed inside the chamber in a movable manner relative to a first direction for pressing the expansible structure when moving in the first direction so that the expansible structure expands in a second direction and the stylus wedges inside the slot of the penholder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
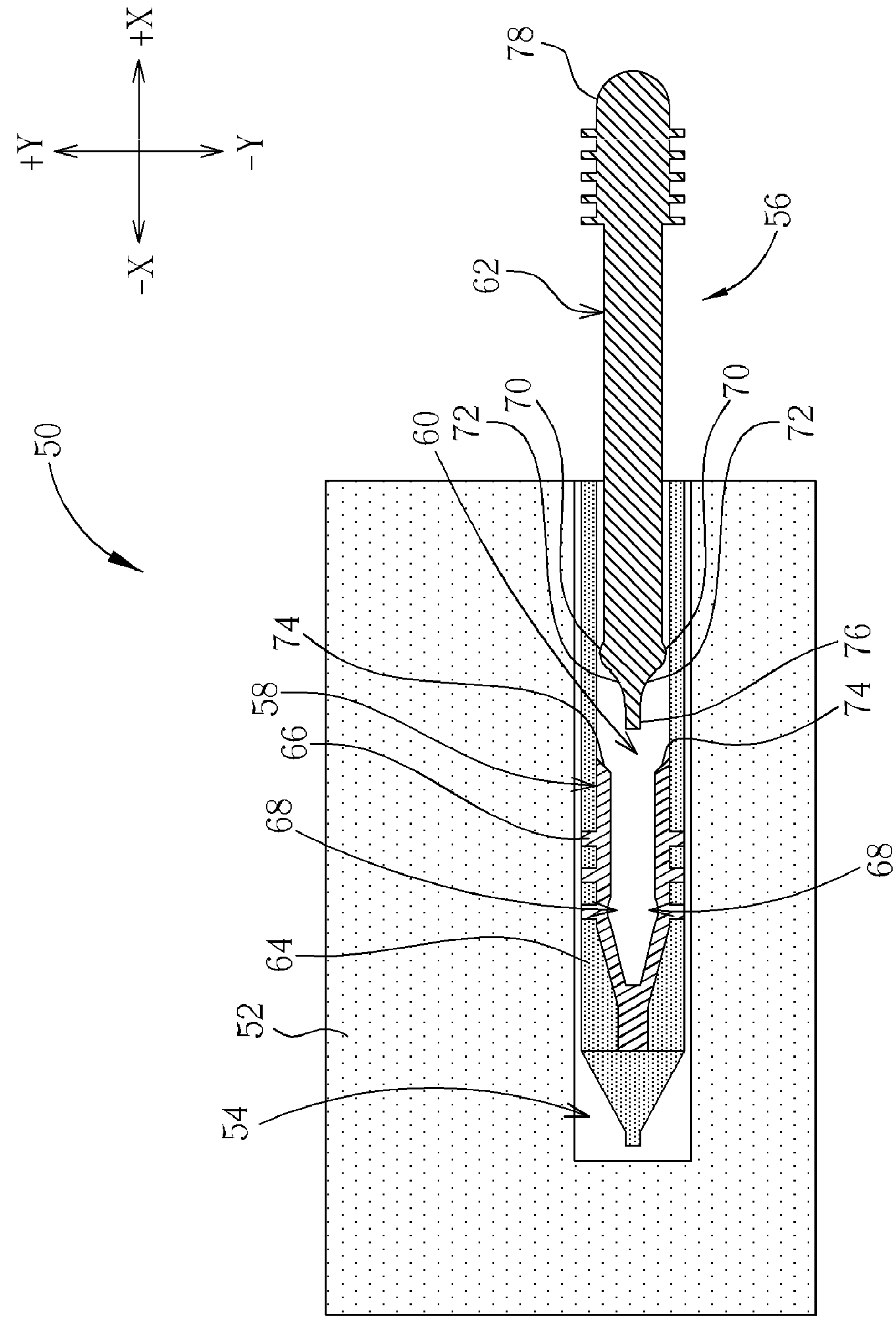
FIG. 1 and FIG. 2 are diagrams of a fixing structure in different conditions according to a preferred embodiment of the present invention.
Figure 2:
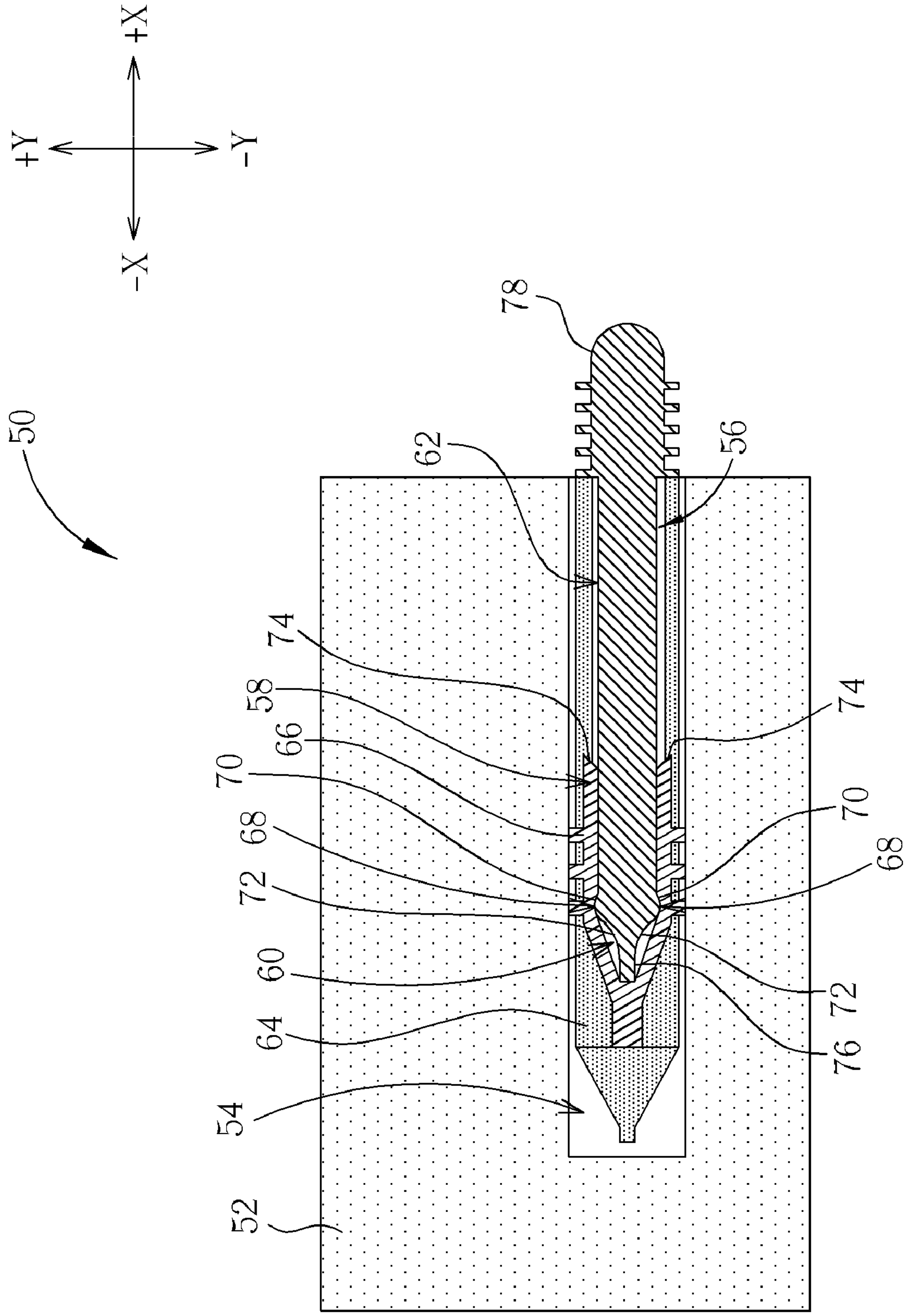

Please refer to FIG. 1 and FIG. 2. FIG. 1 and FIG. 2 are diagrams of a fixing structure 50 in different conditions according to a preferred embodiment of the present invention. The fixing structure 50 includes a penholder 52. A slot 54 is formed inside the penholder 52. The penholder 52 can be disposed on a portable electronic device. For example, the penholder 52 can be a penholder of a personal digital assistant (PDA) or a global positioning system (GPS) device. The fixing structure 50 further includes a stylus 56 installed inside the slot 54 of the penholder 52. The stylus 56 includes an expansible structure 58. A chamber 60 is formed inside the expansible structure 58. The expansible structure 58 can be made of expansible material, such as plastic or metal material. The stylus 56 further includes an inner body 62 installed inside the chamber 60 in a slidable manner relative to ±X directions (a first direction), and an outer body 64 for covering the expansible structure 58. At least one protrusion 66 is formed on the expansible structure 58 which can be a dot structure protruding in ±Y directions (a second direction) through corresponding openings on the outer body 64. Two indentations 68 are formed on an inner side of the expansible structure 58, and two bulges 70 are formed on the inner body 62 and located in positions corresponding to the indentations 68 respectively. The number and disposition of the indentation 68 and the bulge 70 are not limited to this embodiment and can depend on design demand. The bulge 70 can wedge in the indentation 68 when the inner body 62 is contained inside the chamber 60 of the expansible structure 58 completely so as to provide tactile feeling when the inner body 62 is inserted in or pulled out of the chamber 60 of the expansible structure 58. The user can be aware that the stylus 56 has been positioned inside the chamber 60 of the expansible structure 58 completely due to the tactile feeling. Furthermore, at least one first incline 72 is formed on an end of the inner body 62, and at least one second incline 74 is formed on an end of the expansible structure 58 and located in a position corresponding to the first incline 72 for guiding the first incline 72 smoothly when the inner body 62 is moving in the chamber 60 of the expansible structure 58. A stopper 76 is formed on an end of the inner body 62 for stopping by the expansible structure 58 when the inner body 62 is contained inside the chamber 60 of the expansible structure 58 completely. The inner body 62 further includes a handle 78 on the other end for plugging the inner body 62. A plurality of bulges can be disposed on the hand 78 for increasing frictional force.

For containing the stylus 56 inside the slot 54 of the penholder 52, the user can insert the outer body 64 of the stylus 56 into the slot 54 in −X direction first. At this time, the outer body 64 has not been wedged in the slot 54 tightly. Then the user can push the inner body 62 into the chamber 60 of the expansible structure 58 in −X direction. During the process, the second incline 74 of the expansible structure 58 can guide the first incline 72 of the inner body 62 so that the inner body 62 can be inserted inside the chamber 60 of the expansible structure 58 smoothly. As shown in FIG. 2, when the inner body 62 has been inserted inside the chamber 60 of the expansible structure 58 completely, the bulge 70 of the inner body 62 wedges in the indentation 68 of the expansible structure 58 so that the user can be aware that the stylus 56 has been positioned inside the chamber 60 of the expansible structure 58 completely due to the tactile feeling. Simultaneously, the stopper 76 is stopped by an end of the expansible structure 58 when the inner body 62 is contained inside the chamber 60 of the expansible structure 58 completely. When the inner body 62 of the stylus 56 is inserting into the chamber 60 of the expansible structure 58 in −X direction, the interference of the inner body 62 and the expansible structure 58 occurs so that the inner body 62 presses the expansible structure 58 and the expansible structure 58 expands in ±Y directions. The protrusion 66 can move in ±Y directions accordingly and protrudes out of the outer body 64 resulting in interference between the protrusion 66 and the slot 54 of the penholder 52. At this time, the stylus 56 can not slide out of the slot 54 of the penholder 52 in +X direction easily and be fixed in the slot 54 of the penholder 52 tightly.

On the other hand, for drawing the stylus 56 from the slot 54 of the penholder 52, the user can draw out the inner body 62 of the stylus 56 from the chamber 60 of the expansible structure 58 in +X direction first. At this time, the bulge 70 of the inner body 62 separates from the indentation 68 of the expansible structure 58 so that the user can be aware that the stylus 56 is drawing from the chamber 60 of the expansible structure 58 due to the tactile feeling. As shown in FIG. 1, when the inner body 62 of the stylus 56 has been drawn out of the chamber 60 of the expansible structure 58 completely, the inner body 62 can not press the expansible structure 58 anymore, the expansible structure 58 can not expand in ±Y directions, and hence the interference between the protrusion 66 and the slot 54 of the penholder 52 disappears. At this time, the stylus 56 can not be fixed in the slot 54 of the penholder 52, and the user can draw out the outer body 64 of the stylus 56 from the slot 54 of the penholder 52 in +X direction.

Figure 3:
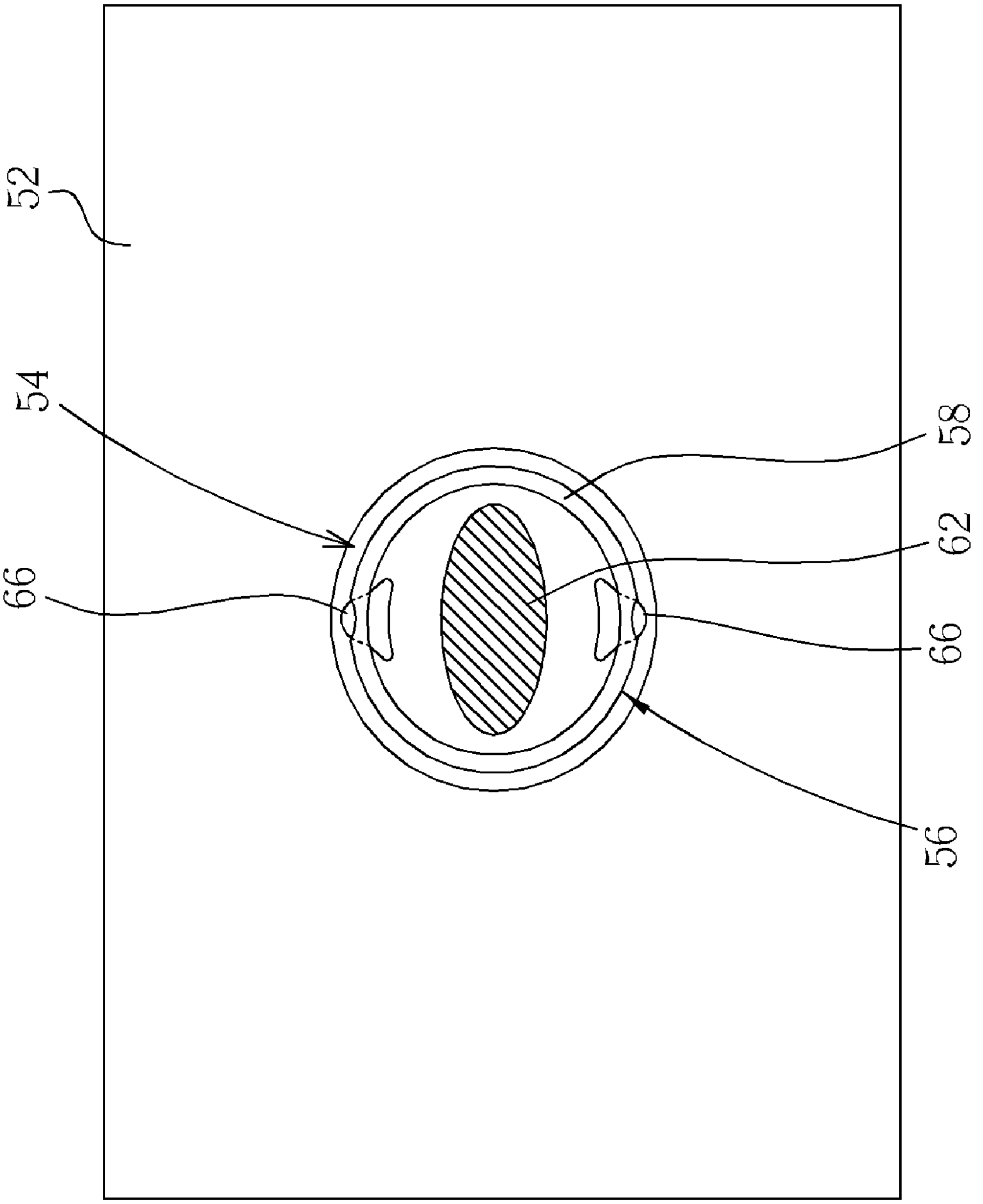
FIG. 3 and FIG. 4 are sectional views of an expansible structure and an inner body according to another embodiment of the present invention.
Figure 4:
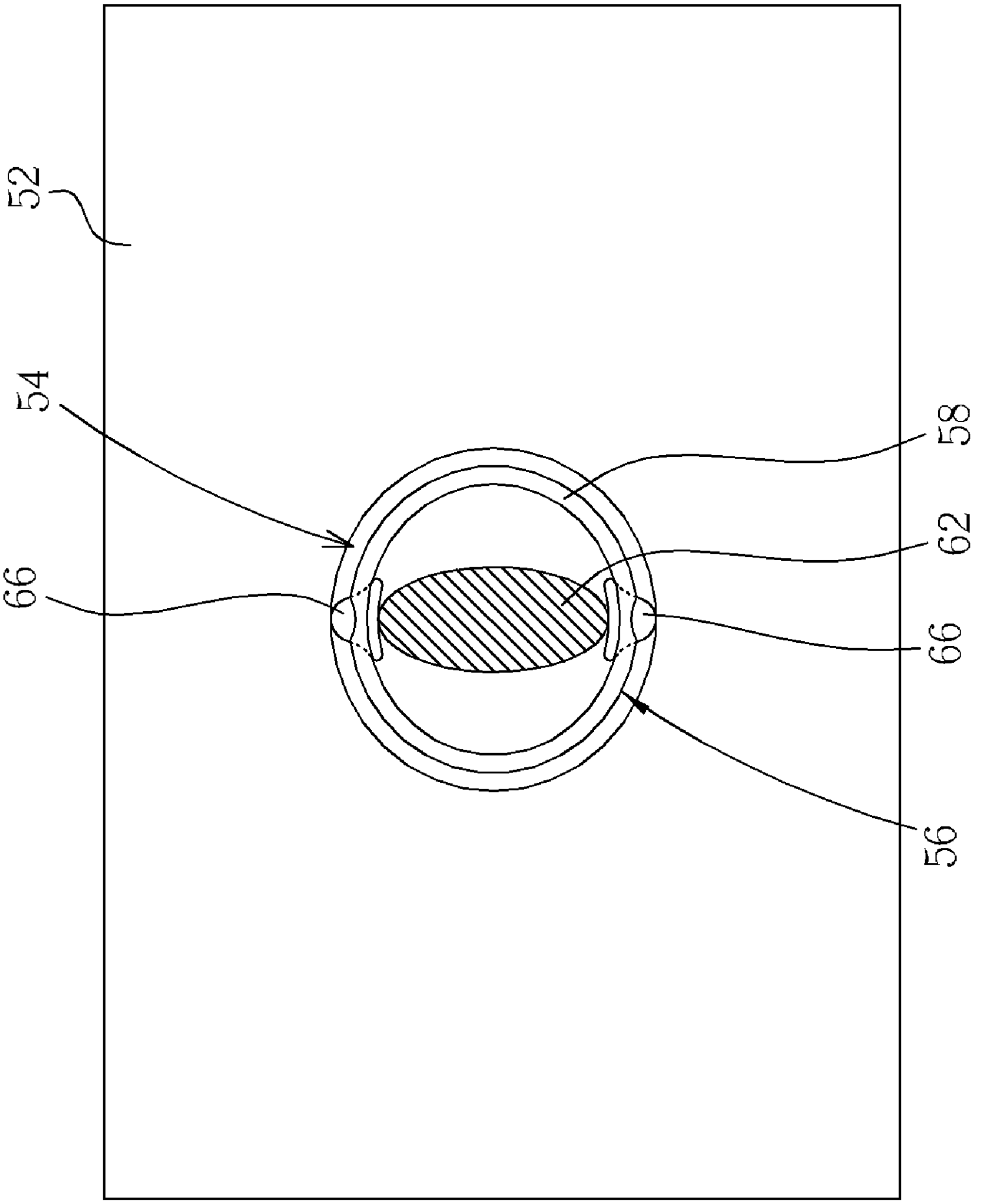

In conclusion, the expansion and the contraction of the expansible structure 58 in ±Y directions are generated by movement of the inner body 62 in ±X directions according to the above-mentioned embodiment. The present invention can utilize other mechanism to generate the expansion and the contraction of the expansible structure 58, such as rotary mechanism. For example, please refer to FIG. 3 and FIG. 4, FIG. 3 and FIG. 4 are sectional views of the expansible structure 58 and the inner body 62 according to another embodiment of the present invention. The inner body 62 can include a cam structure and be installed inside the chamber 60 of the expansible structure 58 in a rotatable manner. As shown in FIG. 3, when the inner body 62 rotates to a position where a short side of the inner body 62 corresponds to the protrusion 66, the inner body 62 can not press the expansible structure 58. As shown in FIG. 4, when the inner body 62 rotates to a position where a long side of the inner body 62 corresponds to the protrusion 66, the inner body 62 presses the expansible structure 58 so that the interference between the protrusion 66 and the slot 54 of the penholder 52 occurs and the stylus 56 can be fixed in the slot 54 tightly. On the other hand, when the inner body 62 rotates to the position where the short side of the inner body 62 corresponds to the protrusion 66, the inner body 62 can not press the expansible structure 58 so that the interference between the protrusion 66 and the slot 54 of the penholder 52 disappears. At this time, the stylus 56 can not be fixed in the slot 54 of the penholder 52, and the user can draw out the stylus 56.

In contrast to the prior art, the present invention utilizes the expansion of the stylus as the interference of the stylus and the slot of the penholder so as to fix the stylus inside the penholder tightly. The present invention has advantages of not wearing away the stylus and the penholder, waterproof effect, and improving manufacture of the penholder due to simply structural design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stylus comprising:

an expansible structure installed inside a slot of a penholder, a chamber being formed inside the expansible structure, and a protrusion being formed on the expansible structure;

an outer body for covering the expansible structure, an opening being formed on the outer body; and an inner body installed inside the chamber in a movable manner along a first direction for outwardly pressing the expansible structure when moving in the first direction, so that the expansible structure outwardly expands in a second direction and the protrusion on the expansible structure protrudes out of the opening on the outer body in the second direction for wedging inside the slot of the penholder, due to structural interference between the protrusion on the expansible structure and the slot of the penholder, and when the inner body of the stylus has been drawn out of the chamber of the expansible structure completely, the inner body not pressing the expansible structure in the second direction and the protrusion on the expansible structure resiliently contracting inside the outer body, so that the structural interference between the protrusion on the expansible structure and the slot of the penholder disappears and the outer body can be drawn out of the slot of the penholder in the first direction.

2. The stylus of claim 1 wherein an indentation is formed on an inner side of the expansible structure, and a bulge is formed on a side of the inner body for wedging in the indentation when the inner body is contained inside the chamber of the expansible structure completely.

3. The stylus of claim 1 wherein a first incline is formed on an end of the inner body, and a second incline is formed on an end of the expansible structure for guiding the first incline when the inner body is moving in the chamber of the expansible structure.

4. The stylus of claim 1 wherein a stopper is formed on an end of the inner body for stopping by the expansible structure when the inner body is contained inside the chamber of the expansible structure completely.

5. The stylus of claim 1 wherein the inner body comprises a handle for plugging the inner body.

6. The stylus of claim 1 wherein the inner body comprises a cam structure for pressing the expansible structure so that the expansible structure expands in the second direction when the cam structure rotates in the first direction.

7. A fixing structure comprising:

a penholder, a slot being formed inside the penholder; and a stylus installed inside the slot of the penholder, the stylus comprising:

an expansible structure, a chamber being formed inside the expansible structure, and a protrusion being formed on the expansible structure;

an outer body for covering the expansible structure, an opening being formed on the outer body; and an inner body installed inside the chamber in a movable manner along a first direction for outwardly pressing the expansible structure when moving in the first direction, so that the expansible structure outwardly expands in a second direction and the protrusion on the expansible structure protrudes out of the opening on the outer body in the second direction for wedging inside the slot of the penholder, due to structural interference between the protrusion on the expansible structure and the slot of the penholder, and when the inner body of the stylus has been drawn out of the chamber of the expansible structure completely, the inner body not pressing the expansible structure in the second direction and the protrusion on the expansible structure resiliently contracting inside the outer body, so that the structural interference between the protrusion on the expansible structure and the slot of the penholder disappears and the outer body can be drawn out of the slot of the penholder in the first direction.

8. The fixing structure of claim 7 wherein an indentation is formed on an inner side of the expansible structure, and a bulge is formed on a side of the inner body for wedging in the indentation when the inner body is contained inside the chamber of the expansible structure completely.

9. The fixing structure of claim 7 wherein a first incline is formed on an end of the inner body, and a second incline is formed on an end of the expansible structure for guiding the first incline when the inner body is moving in the chamber of the expansible structure.

10. The fixing structure of claim 7 wherein a stopper is formed on an end of the inner body for stopping by the expansible structure when the inner body is contained inside the chamber of the expansible structure completely.

11. The fixing structure of claim 7 wherein the inner body comprises a handle for plugging the inner body.

12. The fixing structure of claim 7 wherein the inner body comprises a cam structure for pressing the expansible structure so that the expansible structure expands in the second direction when the cam structure rotates in the first direction.

13. The fixing structure of claim 7 wherein the penholder is a penholder of a personal digital assistant (PDA).

* * * * *